Oct. 27, 1942.  A. V. MARSIK  2,300,301
BUTTON MAKING MACHINE
Filed Jan. 22, 1941  3 Sheets-Sheet 1
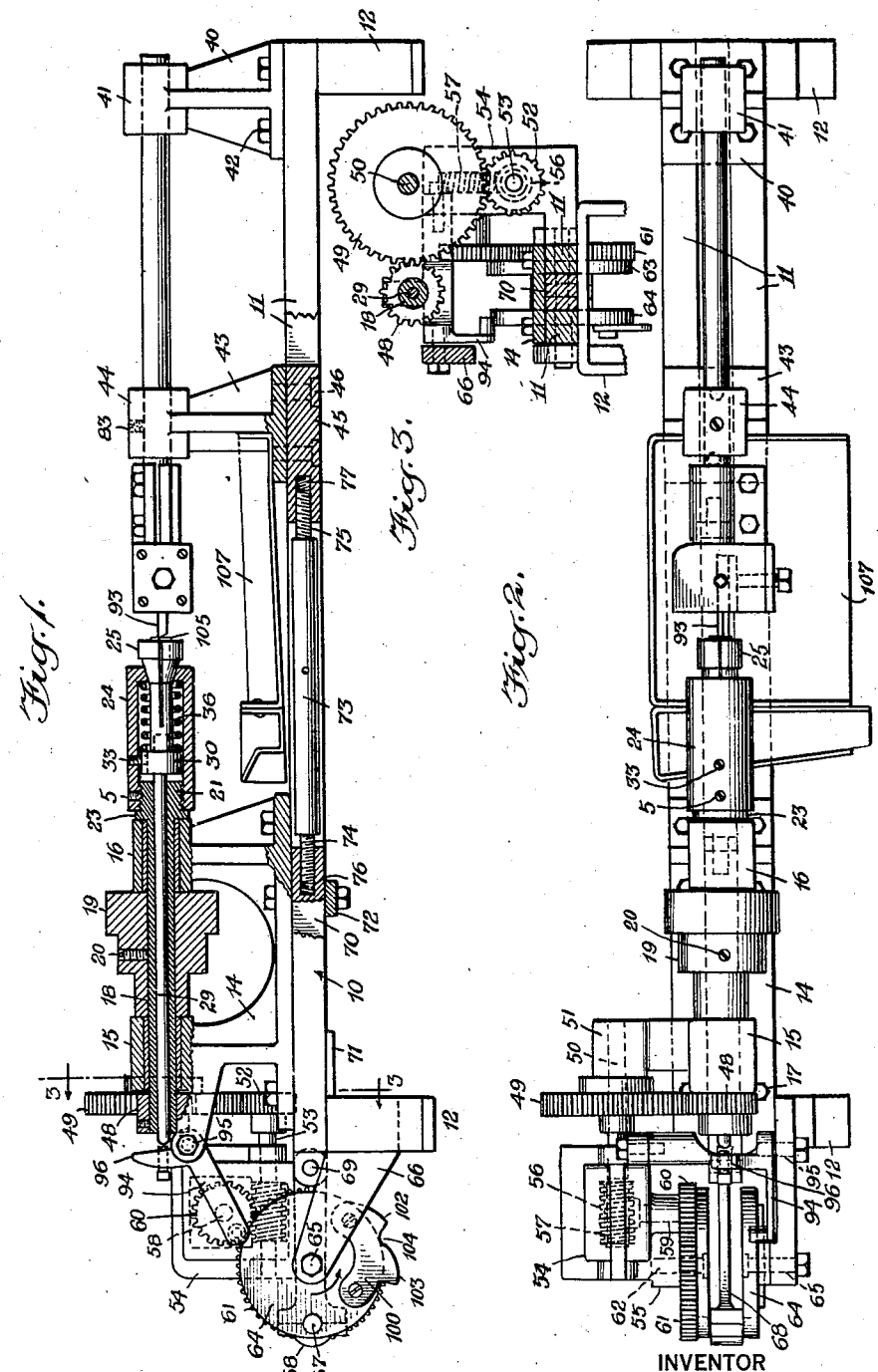
WITNESSES
INVENTOR
Albert V. Marsik
BY
ATTORNEYS Oct. 27, 1942.                A. V. MARSIK                2,300,301
                          BUTTON MAKING MACHINE
                          Filed Jan. 22, 1941            3 Sheets-Sheet 2
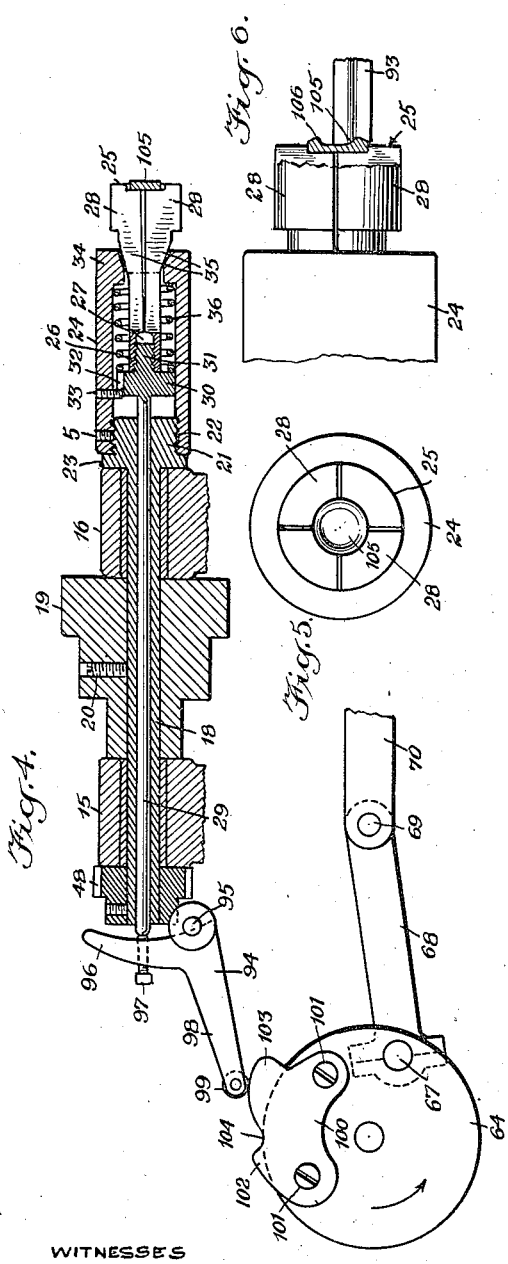
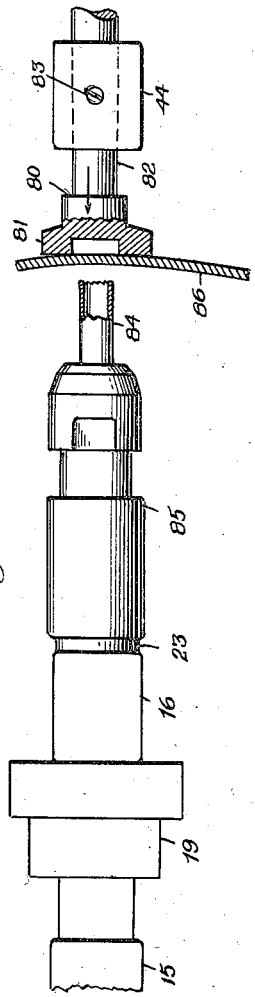
WITNESSES
INVENTOR
Albert V. Marsik
BY
ATTORNEYS

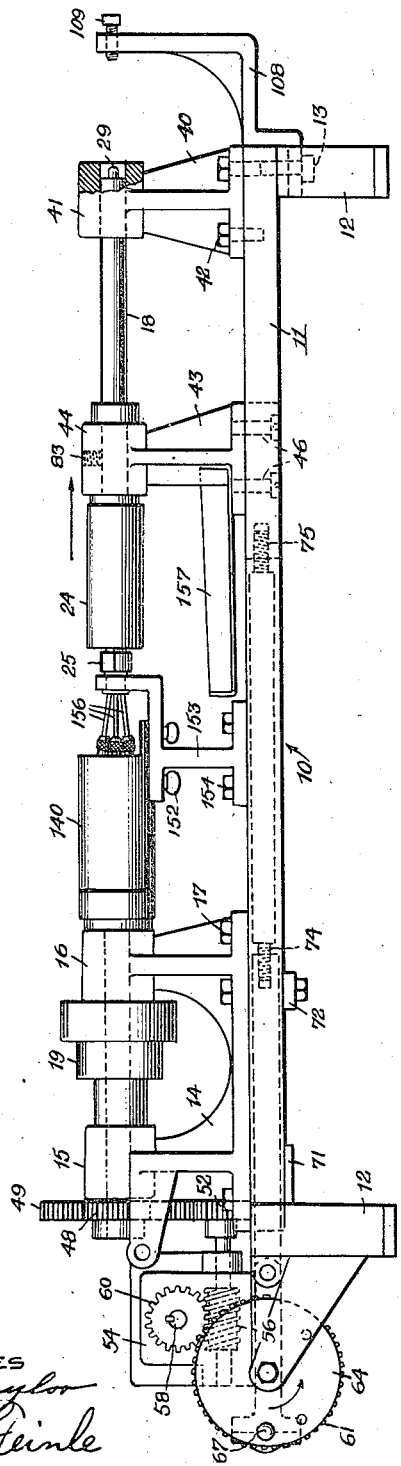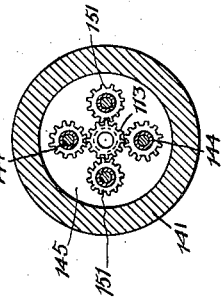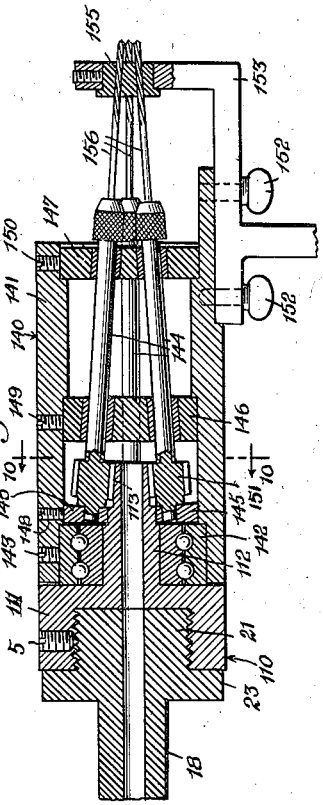

Patented Oct. 27, 1942

2,300,301

UNITED STATES PATENT OFFICE 2,300,301

BUTTON MAKING MACHINE

Albert V. Marsik, Jackson Heights, N. Y.

Application January 22, 1941, Serial No. 375,374

2 Claims. (Cl. 79—6)

This invention relates to a machine which may be used advantageously in the button making industry.

An object of the invention is the provision of a machine which is convertible for performing the distinct operations heretofore performed by separate machines in making buttons.

Another object is the provision of a machine of the indicated character which is capable of cutting button blanks or disks from suitable stock, facing the blanks and then drilling the usual holes therein.

Another object is to obviate the cost of maintaining separate machines for performing the distinct operations aforesaid, and also to attain the advantage of a saving in floor space by requiring but a single machine for performing said operations.

With the foregoing and other objects in view the invention resides in the combination, arrangement and operation of the parts of the machine described in the following specification as one embodiment of the invention which is defined as to scope in the appended claims and which is illustrated by way of example in the accompanying drawings, in which:

Fig. 1 is a side view of a machine embodying certain features of the invention, and parts of the machine being shown in section;

Fig. 2 is a plan view of the machine appearing in Fig. 1;

Fig. 3 is a section taken on the line 3—3 of Fig. 1 looking in the direction indicated by the arrows;

Fig. 4 is an enlarged longitudinal section of the chuck assembly and operating means therefor, said means being shown in elevation;

Fig. 5 is an end view of the chuck shown in Figs. 1, 2 and 4 for holding the button blanks;

Fig. 6 is a side view of the chuck and its head illustrating the manner in which a blank is faced;

Fig. 7 is a side view and part section of an assembly of parts of the machine for cutting the button blanks from suitable stock;

Fig. 8 is a view similar to Fig. 1, but showing the machine converted for drilling holes in the button blanks;

Fig. 9 is an enlarged longitudinal section of the drill assembly appearing in Fig. 8;

Fig. 10 is a section taken on the line 10—10 of Fig. 9 and looking in the direction indicated by the arrows.

The machine of the present invention is designed and adapted primarily for making buttons from mother-of-pearl, Celluloid, bone, horn, composition, and other materials. It is understood, however, that the machine may have other uses. In the manufacture of buttons, blanks are first cut from the desired material, the blanks are then faced, and then said blanks have holes drilled therein. The machine with its appurtenances and attachments is capable of carrying out the aforesaid distinct operations and does not require individual machines to accomplish the same as is now the practice.

The machine includes a bed or base 10 consisting of longitudinal members 11 arranged in spaced parallel relation, and cross members 12 disposed, respectively, at the adjacent ends of the members 11 and are secured thereto in any suitable manner as by the employment of studs 13, one of which is indicated in dotted lines in Fig. 8. The cross members 12 provide feet for the base at the opposite ends thereof. A pedestal 14 having axially alined bearings 15 and 16, respectively, is secured to the members 11 by suitable fastening elements 17 at the left-hand end of the base 10. A hollow spindle 18 is supported for rotation by the bearings 15 and 16. A duplex pulley 19 is mounted on the spindle 18 and is made fast thereon by a set screw 20. The pulley 19 is arranged between the bearings 15 and 16 and is of a size to abut against these bearings. It will therefore be understood that the pulley 19 as arranged will prevent the axial movement of the spindle 18. The pulley 19 serves for the purpose of rotating the spindle 18 when driven by a suitable belt. The inner end of the spindle 18 has a head 21 having threads 22 and a circular flange 23. A barrel or hollow stock 24 has threads complemental to the threads 22 in order to be detachably connected with the head 21. The stock 24 carries a chuck 25 consisting of a body 26 having a tapped bore 27 therein and resilient jaws 28 integral with the body 26. A rod 29 has a head 30 on one end thereof. A threaded extension 31 integral with the head and in axial alinement with the head 29 is adapted to be screwed into the bore 27 in order to detachably connect the rod 29 with the chuck 25. The rod 29 is of a diameter to loosely extend through the hollow spindle 18 in order to slide or be axially movable in the spindle 18, while the chuck 25 may have axial movement in opposite directions with respect to the stock 24. The head 30 has a longitudinal groove 32 in the periphery thereof which accommodates the inner end of a key in the form of a screw 33 carried by the stock 24. The key 33 engaged in the groove 32 prevents rotation of the chuck 25 while permitting axial movement thereof. Means 34 on the stock 24 coacts with means 35 on the chuck 25 to cause the jaws 28 to flex inwardly to grip a button blank when the chuck 25 moves axially rearward, and said means allows the jaws 28 to swing outwardly to a normal relation in order to release the blank when the chuck moves axially outward. The means 34 is in the form of a conical wall provided by an opening in the forward end of the stock 24, and the means 35 consists of inclined surfaces, respectively, of the jaws 28. Resilient means in the form of a coil spring 36 serves to move the chuck 25 axially inward to cause the jaws to grip a button blank until released. The spring 36 is arranged within the stock 24 surrounding the jaws and body 26, and one end of the spring bears against the stock and its opposite end bears against the head 30. The movement of the rod 29 axially forward causes a similar movement of the chuck 25 in order to release the blank held by the jaws 28.

Means is provided for supporting either a material holder or a tool holder according to the operation to be performed. The said means consists of a pedestal 40 having a bearing 41 which is secured to the members 11 by fastening elements 42 at the extreme right-hand end of the base 10. Also a pedestal 43 having a bearing 44 is positioned in spaced relation to the right of the pedestal 14 for sliding movement on top of the members 11. A slide 45 is secured to the pedestal 43 on the under side thereof by fastening elements 46. The members 11 of the base being in spaced parallel relation provide a guideway 47 in which the slide 45 moves guided by the members 11. The bearings 41 and 44 are in axial alinement with each other and also in axial alinement with the spindle 18.

Motion transmission mechanism operated in response to the rotation of the spindle 18 serves to cause the axial forward movement of the rod 29 and its chuck 25, and also to reciprocate or cause the sliding movement of the pedestal 43 in opposite directions. The said mechanism includes a small gear 48 fast on the spindle 18 beyond the bearing 15. The gear 48 meshes with a large gear 49 rotatable on an arbor 50 carried by a bracket 51 on the pedestal 14. The gear 49 meshes with a small gear 52 fast on one end of a shaft 53. The shaft 53 is supported by bearings embodied by a casing 54. This casing is securely held in place on a bracket 55 secured to the base 10. The shaft 53 carries a worm 56 which meshes with a worm gear 57 fast on a shaft 58 supported for rotation by a bearing 59 which is a part of the casing 54. The worm 56 and gear 57 are arranged within the casing 54. A gear 60 fast on the outer end of the shaft 58 meshes with a large gear 61 journaled for rotation on a stub shaft 62 carried by the bracket 55. The gear 61 has formed integral therewith and concentric thereto a disk 63. A similar disk 64 is mounted for rotation on a stub shaft 65 carried by a bracket 66 secured to the base 10. The shaft 65 is in axial alinement with the shaft 62. A wrist pin 67 is supported by the disks 63 and 64 between the same since these disks are arranged in spaced relation to each other. These disks, together with the pin 67, constitute a crank. A pitman 68 has one end thereof connected with the pin 67 and its opposite end is pivotally connected, as at 69, with one end of a slide 70 arranged in the guideway 47. The slide 70 rests on cross pieces 71 and 72 respectively secured to the members 11 on the under side thereof. The slide 70 is connected with the slide 45 by a connecting rod 73 whose opposite ends 74 and 75 have right and left threads received in tapped holes 76 and 77, respectively, in the slides 70 and 45. It will now be understood that the pedestal 43 will be moved or slid back toward the pedestal 40 and therefore toward the pedestal 14 in response to the rotation of the spindle 18 and by virtue of the intervention of the gear train, crank, pitman and connected slides hereinbefore described.

When it is desired to cut button blanks from a piece of material, such as mother-of-pearl or the other materials mentioned, use is made of a suitable support 80 consisting of a hollow abutment 81 having a stock in the form of a shaft 82, as shown in Fig. 7. This shaft 32 is of a size to loosely fit in the bearings 41 and 44. The support 80 is held against movement by a set screw 83 carried by the bearing 44. Use is made of a tubular cutter 84 which is held by a chuck 85 of conventional type which is adapted for connection with the head 21. In other words, the chuck 85 is screwed on the head until it abuts the flange 23. The chuck 85 and its cutter 84 rotate with the spindle 18, and appear in Fig. 7. A piece of material from which the button blanks are cut is designated 86. This material is held against the abutment 81 by the operator attending the machine. As the pedestal 43 is slid back and forth, the support 80 will be moved likewise. Consequently, the material 86 will be fed intermittently to the cutter 84 which will cut out a circular button blank. Each time the support 80 is advanced to the cutter 84 the material 86 is shifted by the operator to produce as many button blanks as possible from the material.

In order to carry out the facing operation on the blanks use is made of a tool holder 90 including a round stock 91 and a clamp 92 carried by the forward end of the stock 91. The stock 91 may extend through the bearings 41 and 44 to be supported thereby. The set screw 83 serves to hold the tool holder 90 in fixed position in order that it will reciprocate with the pedestal 43. A suitable facing tool 93 is held in position by the clamp 92. The clutch unit 25 is applied to the spindle head 21 by screwing the stock 24 into threading engagement therewith. A set screw 5 carried by the stock 24 and engageable with the head 21 holds the chuck against rotation with respect to the spindle 18 but causes the chuck to rotate with it. The tool holder 90 and the chuck unit 25 appear in Figs. 1 and 2 of the drawings in use.

In order to cause the chuck 25 to move outwardly to release a button blank and to subsequently receive a new blank after the previous blank has been faced, there is provided a lever 94 which is fulcrumed as at 95 on the pedestal 14 and casing 54. The end 96 of the lever carries an adjusting screw 97, and the other end 98 of the lever has a roller 99. A cam 100 is detachably secured to the crank disc 64 by fastening elements 101. This cam is a double-acting cam having two cam portions or high points 102 and 103, respectively, and an intervening notch 104. The cam 100 cooperates with the lever 94 in the rotation of the crank disk 64. The cam is arranged in advance of the pin 67. When the cam portion 102 acts on the roller 99, the lever 94 will be moved causing the screw 97 on the end 96 to bear on the rod, causing the clutch 25 to move forwardly and release a button blank which has been previously faced by the facing tool 93. The spring 36 causes retraction of the chuck 25 together with the rod 29 due to the fact that the roller 99 drops into the notch 104. This is immediately followed by the cam portion 102 imparting movement to the lever 94 which, in turn, operates the rod 29, causing the chuck 25 to again move forwardly, whereupon the jaws 28 will spring outwardly to enable an operator to insert a new button blank into the chuck as it is being retracted by the spring 36 when the roller 99 drops behind the cam portion 103. While the button blank is being inserted in the chuck 25, the tool holder 90 is in its fully retracted position to enable the insertion of the button blank without injury to the operator. The tool holder 90 moves forwardly to engage the facing tool 93 with the new button blank, which removes material of the blank to form the usual annular rim or bead, as shown in Fig. 6. The button blank is designated 105 and the rim formed by the tool 93 is designated 106. As the disk 64 continues to rotate the operation hereinbefore described is repeated. As the blanks are released from the chuck 25 they drop in a tray 107 carried by the pedestal 43. It is to be understood that when cutting out blanks by the use of the attachments 80 and 85, the cam 100 will be detached from the disk 64 and the lever 94 will also be detached since these parts are not required.

In order to carry out the hole drilling operation, use is made of the clutch unit 25 whose spindle is extended through the bearings 41 and 44, the set screw 83 serving to hold the unit in place so as to reciprocate with the pedestal 43, as shown in Fig. 8. A bracket 108 is secured to the right-hand end of the base 10. An adjusting screw 109 is carried by the bracket 108 and is disposed in axial alinement with the rod 29, in order to actuate the rod 29 each time the pedestal 43 is moved to the limit of its rearward travel. This causes the clutch 25 to release the drilled button. As the pedestal 43 moves forwardly a new blank may be inserted in the clutch for the drilling operation.

A drill unit 140, shown most clearly in Fig. 9, is used for drilling holes in the blanks and in the present instance this unit drills four holes, although a lesser number may be drilled in the blanks. The drill unit consists of a stock 110 providing a threaded socket 111 which may be screwed on to the head 21, and an extension 112 integral with the socket and disposed centrally thereof, which is provided with a pinion 113. The set screw 5 securely holds or locks the stock 110 on the head 21 so as to rotate with the spindle 18. A barrel 114, equal in diameter to the socket 111, has a roller bearing 142 in one end, said bearing being held in place by a set screw 143. Drills 144 are supported by bearings 145, 146 and 147, respectively. These bearings 145, 146 and 147 are held in place within the barrel 141 transversely thereof by set screws 148, 149 and 150, respectively, carried by the barrel. The drills 144 are arranged in a forwardly converging relationship. Each drill shaft has fast thereon a pinion 151 which meshes with the pinion 113. The barrel 141 is held in fixed position by means of set screws 152 carried by a bracket 153 secured to the base members 11 by fastening elements 154. This bracket 153 also carries a bearing 155 which steadies the bits 156 of the drills 144. The bits 156 project slightly beyond the bearing 155. Inasmuch as the barrel 141 is held stationary the drills 144 will not be permitted to planetate about the axis of the spindle 18, but will be permitted to rotate on their own axes. This is caused by the rotation of the spindle 18, which causes the pinion 113, through the intervention of the stock 110, to rotate the pinions 151, causing the rotation of the drills and their bits. As each faced button blank is presented by the clutch unit 25 in the forward travel of the pedestal 43 by the action of the crank, four holes will be drilled in the blank, after which the latter is dropped into a tray 157 placed on the pedestal 43. It is understood that the tray 157 is substituted for the tray 107.

From the foregoing it will be understood that the machine is readily convertible for carrying out button blank cutting operations, facing operations, and drilling operations by reason of the interchangeable use of the chuck unit 25, the work or material support 80, the tool holder 90, and the drill unit 140.

It will also be apparent that the machine automatically provides for uniform thickness of the buttons; and that adjustments may be readily made which enable the blank cutting, facing and drilling operations to be carried out on materials of different thicknesses.

I claim:

1. In a button making machine, a reciprocatory tool holder, a hollow chuck spindle, a chuck operating rod extending through said spindle having axial movement as well as rotary movement, and mechanism operated by said spindle upon the rotation of the latter to reciprocate the tool holder and to cause the axial movement of said rod, said mechanism comprising a crank, gearing operated by the spindle, said crank being connected with and operated by said gearing, a pitman connected with said crank, a slide connected with said tool holder and pitman, a cam on said crank rotatable therewith, and a lever acted on by said cam and bearing on one end of said rod.

2. In a button making machine as set forth in claim 1, wherein said cam and lever may be detached to render said mechanism operable only for reciprocating the tool holder.

ALBERT V. MARSIK.